United States Patent
Zan et al.

(10) Patent No.: US 11,391,685 B2
(45) Date of Patent: Jul. 19, 2022

(54) SENSITIVE DEVICE AND METHOD OF FORMING THE SAME

(71) Applicant: E Ink Holdings Inc., Hsinchu (TW)

(72) Inventors: Hsiao-Wen Zan, Hsinchu (TW);
Chuang-Chuang Tsai, Hsinchu (TW);
Po-Yi Chang, Hsinchu (TW);
Hung-Chuan Liu, Hsinchu (TW);
Yi-Ting Chou, Hsinchu (TW);
Wei-Tsung Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 454 days.

(21) Appl. No.: 15/702,747

(22) Filed: Sep. 12, 2017

(65) Prior Publication Data

US 2018/0128762 A1 May 10, 2018

(30) Foreign Application Priority Data

Nov. 10, 2016 (CN) .......................... 201610988314.6

(51) Int. Cl.
*G01N 27/12* (2006.01)
*B81C 1/00* (2006.01)

(52) U.S. Cl.
CPC ........... *G01N 27/12* (2013.01); *G01N 27/127* (2013.01)

(58) Field of Classification Search
None
See application file for complete search history.

(56) References Cited

U.S. PATENT DOCUMENTS

| 8,094,247 B2 | 1/2012 | Allemand et al. | |
|---|---|---|---|
| 8,309,857 B2 | 11/2012 | Goto et al. | |
| 9,006,796 B2 | 4/2015 | Occhipinti | |
| 9,219,240 B1 | 12/2015 | Liang et al. | |
| 2002/0118027 A1* | 8/2002 | Routkevitch | G01N 27/125 324/694 |
| 2008/0150556 A1* | 6/2008 | Han | B82Y 15/00 324/693 |
| 2009/0084678 A1* | 4/2009 | Joshi | G01N 27/4146 204/403.14 |

(Continued)

FOREIGN PATENT DOCUMENTS

| CN | 101512754 A | 8/2009 |
|---|---|---|
| CN | 103733311 A | 4/2014 |

(Continued)

OTHER PUBLICATIONS

Title: Indium Oxide Melting Point; URL: https://www.americanelements.com/indium-oxide-powder-1312-43-2 (Year: 2021).*

(Continued)

*Primary Examiner* — Jill E Culler
*Assistant Examiner* — Ruben C Parco, Jr.
(74) *Attorney, Agent, or Firm* — CKC & Partners Co., LLC

(57) ABSTRACT

A sensitive device includes a plurality of first conductive nanostructures, a conductive layer and at least one electrode. The conductive layer covers the first conductive nanostructures. An intrinsic melting point of the conductive layer is higher than that of the first conductive nanostructures. At least one of the conductive layer and the first conductive nanostructures is sensitive to gas. The electrode is electrically connected to at least one of the first conductive nanostructures and the conductive layer.

6 Claims, 4 Drawing Sheets

(56) References Cited

U.S. PATENT DOCUMENTS

| | | | |
|---|---|---|---|
| 2010/0173070 A1* | 7/2010 | Niu | B01J 35/0013 |
| | | | 427/215 |
| 2015/0233851 A1* | 8/2015 | Zan | H01L 51/0001 |
| | | | 73/31.06 |

FOREIGN PATENT DOCUMENTS

| | | | | | |
|---|---|---|---|---|---|
| CN | 103760749 | A | | 4/2014 | |
| CN | 104112544 | A | | 10/2014 | |
| CN | 104228208 | A | | 12/2014 | |
| CN | 104614401 | A | | 5/2015 | |
| JP | 2005017141 | A | | 1/2005 | |
| JP | 2005191526 | A | * | 7/2005 | G03F 7/0035 |
| JP | 2005191526 | A | | 7/2005 | |
| JP | 2007035298 | A | | 2/2007 | |
| JP | 2008124188 | A | * | 5/2008 | |
| KR | 20100044944 | A | * | 5/2010 | |
| KR | 20120131483 | A | | 12/2012 | |
| KR | 101887281 | B1 | * | 8/2018 | |
| WO | WO-2008009779 | A1 | * | 1/2008 | B22F 1/02 |

OTHER PUBLICATIONS

Title: Silver Melting Point; URL: https://www.bullionbypost.co.uk/index/silver/melting-point-of-silver/ (Year: 2021).*
Chuanwei Cheng et al., "Fabrication and SERS Performance of Silver-Nanoparticle-Decorated Si/ZnO Nanotrees in Ordered Arrays," Applied materials and interfaces, vol. 2, No. 7, pp. 1824-1828, 2010.
Yang Liu et al., "Ag nanoparticles ZnO nanowire composite arrays: an absorption enhanced UV photodetector," Optics Express, vol. 22, No. 24, 2014.
Corresponding Taiwanese Office Action that the Non-Patent Literatures were cited dated Apr. 20, 2017.
Corresponding Chinese office action dated Nov. 5, 2019.
Corresponding Chinese office action dated May 15, 2020.

* cited by examiner

SENSITIVE DEVICE AND METHOD OF FORMING THE SAME

CROSS-REFERENCE TO RELATED APPLICATION

This application claims priority to Chinese Application Serial Number 201610988314.6, filed Nov. 10, 2016, which is herein incorporated by reference.

BACKGROUND

Technical Field

The present disclosure relates to a sensitive device and the method of forming the same.

Description of Related Art

Gas sensor can absorb gas through a gas sensitive device. Variation of physical or chemical property (such as electrical resistance variation) is generated as the gas sensitive device absorbs gas, and hence the gas sensor can detect gas using the variation of property. With the improvement of material technology, conductive nanomaterial is widely used in many fields. Because the conductive nanomaterial has an excellent electrical conductivity, some gas sensors also include conductive nanomaterial to serve as sensitive device. However, forming the gas sensor with the conductive nanomaterial still faces with some difficulties to be overcome.

SUMMARY

Some embodiments of the present disclosure can effectively use conductive nanomaterial as a sensitive device of a gas sensor.

According to some embodiments of the present disclosure, a sensitive device includes a plurality of first conductive nanostructures, a conductive layer and at least one electrode. The conductive layer covers the first conductive nanostructures. An intrinsic melting point of the conductive layer is higher than that of first conductive nanostructures. At least one of the conductive layer and the first conductive nanostructures is sensitive to gas. The electrode is electrically connected to at least one of the first conductive nanostructures and conductive layer.

According to some embodiments of the present disclosure, a method of forming a sensitive device includes forming a plurality of conductive nanostructures on a substrate; covering a group of the conductive nanostructures with a conductive layer, and exposing another group of the conductive nanostructure, wherein at least one of the conductive nanostructures and the conductive layer is sensitive to gas; performing a thermal process to the conductive layer and the conductive nanostructures, wherein the exposed group of conductive nanostructures are melted by the thermal process, and the covered group of conductive nanostructures are not melted by the thermal process; and forming at least one electrode to electrically connect to at least one of the conductive layer and the covered group of conductive nanostructures.

In the foregoing embodiments, when the conductive nanostructures and conductive layer undergo a thermal process, the conductive layer can prevent the conductive nanostructures from being melted or even broken by the thermal process. This is due to the fact that the intrinsic melting point of the conductive layer covering the conductive nanostructures is higher than that of the conductive nanostructures. As a result, the embodiments of the present disclosure can effectively use conductive nanomaterial to form the sensitive device of the gas sensor, and is advantageous to satisfy high temperature operations of the gas sensor as well.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
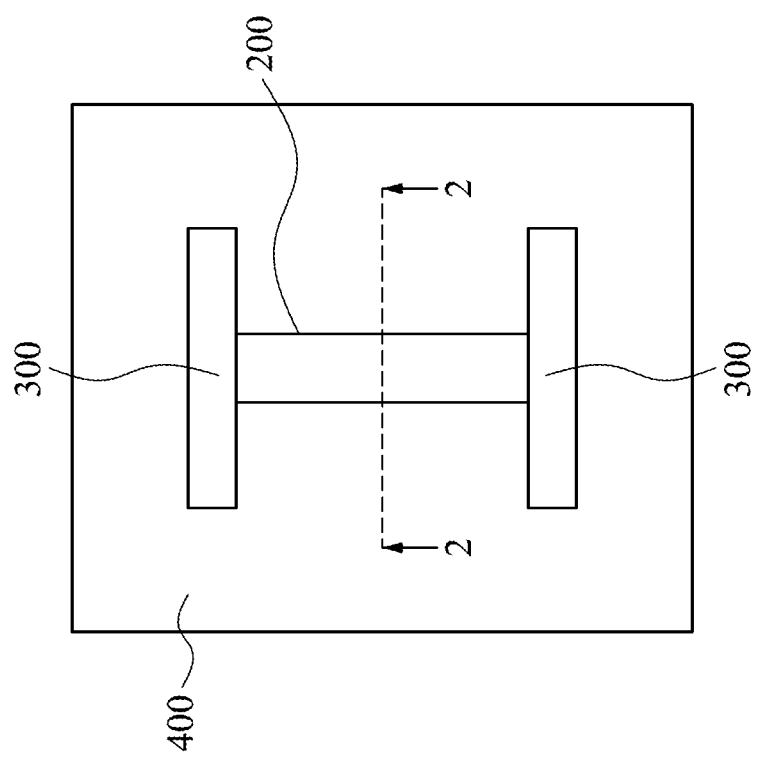
FIG. 1 is a top view of a sensitive device in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
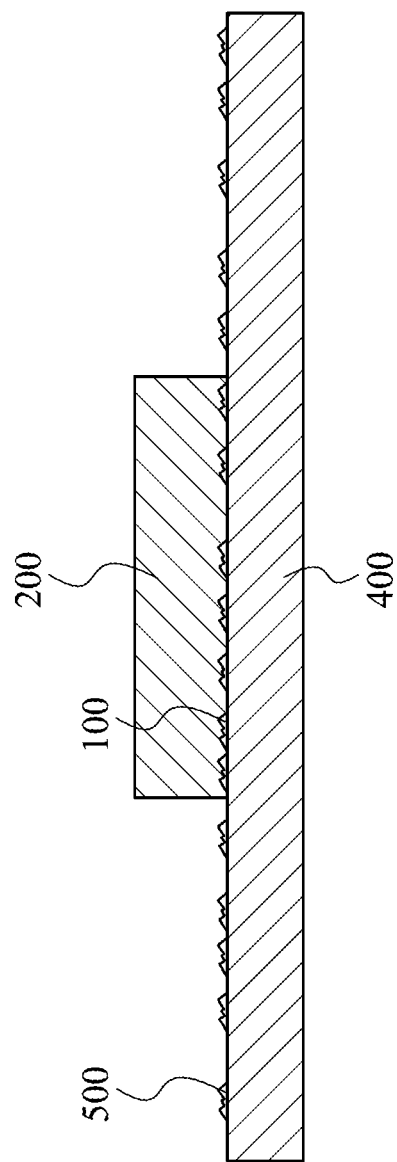
FIG. 2 is a cross-sectional view of the sensitive device taken along line 2-2 in FIG. 1.

FIG. 1 is a top view of a sensitive device in accordance with some embodiments of the present disclosure. FIG. 2 is a cross-sectional view of the sensitive device taken along line 2-2 in FIG. 1. As shown in FIGS. 1 and 2, the sensitive device includes a plurality of first conductive nanostructures 100, a conductive layer 200 and electrodes 300. The conductive layer 200 is disposed on the first conductive nanostructures 100. In other words, the first conductive nanostructures 100 are covered with the conductive layer 200. The electrodes 300 are electrically connected to at least one of the first conductive nanostructures 100 and the conductive layer 200. In other words, in some embodiments, the electrodes 300 may be electrically connected to the first conductive nanostructures 100, but not be connected to the conductive layer 200; in some embodiments, the electrodes 300 may be electrically connected to the conductive layer 200, but not connected the first conductive nanostructures 100; in some other embodiments, the electrode 300 may be electrically connected to the first conductive nanostructures 100 and the conductive layer 200.

At least one of the first conductive nanostructures 100 and the conductive layer 200 is sensitive to gas. It is understood that, in this context, a device is "sensitive to gas" refers to that a resistance or other electric properties of the device vary when the device absorbs the gas. In other words, in some embodiments, the first conductive nanostructures 100 are sensitive to gas, and hence variation of the resistance or the other electric properties can be generated when the first conductive nanostructures 100 absorb gas; in some embodiments, the conductive layer 200 is sensitive to gas, and hence variation of the resistance or the other electric properties can be generated when the conductive layer 200 absorbs gas; in some embodiments, the first conductive nanostructures 100 and the conductive layer 200 are sensitive to gas, so that the resistance or the other electric properties of them are varied due to absorption of gas. Based on such characteristics, the gas sensor can use the electrodes 300 to detect the variation of the resistance or other electric properties of the first conductive nanostructures 100, conductive layer 200 or combinations thereof, so that gas detection can be enabled. As a result, the first conductive nanostructures 100, conductive layer 200 and electrodes 300 can in combination serve as the sensitive device of the gas sensor.

Due to the fact that a scale of the first conductive nanostructures 100 is nanoscale, a specific surface area of the first conductive nanostructures 100 is larger than that of large-sized conductive structures (for example, the scale of the conductive structures is micrometer-scaled or even millimeter-scaled), so as to benefit gas absorption, and hence gas detection ability can be improved. Moreover, the large specific surface area of the first conductive nanostructures 100 is advantageous to increase electric conductivity. In some embodiments, the first conductive nanostructures 100 may be conductive nanowires or conductive nanorods.

Due to the fact that the scale of the first conductive nanostructures 100 is nanoscale, the first conductive nanostructures 100 are susceptible to high temperature, so that the first conductive nanostructures 100 may be broken as they melt due to the high temperature. Therefore, in some embodiments, an intrinsic melting point of the conductive layer 200 is higher than that of the first conductive nanostructures 100. Because the conductive layer 200 covers the first conductive nanostructures 100 and has higher melting point than that of the first conductive nanostructures 100, the conductive layer 200 can prevent the first conductive nanostructures 100 from melting due to the high temperature. Therefore, when the first conductive nanostructures 100 and the conductive layer 200 are together in the high temperature ambience, the conductive layer 200 can prevent the underlying first conductive nanostructures 100 from melting in high temperature ambience. As a result, the sensitive device can be operated in high temperature ambience, and hence is satisfactory for a high temperature operation. Furthermore, because the conductive layer 200 can help the first conductive nanostructures 100 to resist against the high temperature, the conductive layer 200 can protect the first conductive nanostructures 100 when forming steps of the sensitive device include a high temperature treatment (for example, annealing process).

In some embodiments, the first conductive nanostructures 100 may include sliver, so that the first conductive nanostructures 100 may be silver nanowires. In some embodiments, material of the conductive layer 200 can include metallic oxide, and the metallic oxide may be ITO, IZO, AZO, AlO, INO, GAO or combinations thereof. Due to the fact that the melting point of the metallic oxide is higher than that of the silver nanowires, the metallic oxide can prevent the underlying silver nanowires from melting in high temperature. As a result, the metallic oxide and the silver nanowires can be operated in high temperature ambience, so the gas detection ability is not affected by the high temperature. Furthermore, the metallic oxide may be sensitive to the gas, so that resistance or other electric properties thereof may vary as it absorbs gas. Furthermore, even though the silver nanowires are covered with the metallic oxide and are therefore hard to absorb the gas on surfaces thereof, the sensitive device can still use the metallic oxide to absorb the gas, and then uses a gas sensitive property of the metallic oxide to achieve gas detection.

In some embodiments, the first conductive nanostructures 100 are wrapped in the conductive layer 200. In other words, the surfaces of the first conductive nanostructures 100 can contact the conductive layer 200, and are enclosed by the conductive layer 200. Therefore, the conductive layer 200 with high melting point can protect the first conductive nanostructures 100 with low melting point in a more comprehensive manner, so as to prevent the first conductive nanostructures 100 with low melting point from melting due to the high temperature.

In some embodiments, the sensitive device can also include a substrate 400. The substrate 400 can carry the first conductive nanostructures 100. In other words, the first conductive nanostructures 100 are disposed on the substrate 400 and are covered with the conductive layer 200. In other words, the first conductive nanostructures 100 are located between the substrate 400 and the conductive layer 200. In some embodiments, the sensitive device can also include a plurality of second conductive nanostructures 500. The first conductive nanostructures 100 and the second conductive nanostructures 500 are arranged on the different regions of the substrate 400, and the second conductive nanostructures 500 are not covered by the conductive layer 200. In other words, during the process of forming the sensitive device, the second conductive nanostructures 500 are free from protection of the conductive layer 200, and therefore, when formation of the sensitive device includes thermal process (for example, annealing process), the second conductive nanostructures 500 may melt or even be broken due to the high temperature. For example, the intrinsic melting point of the conductive layer 200 can be higher than that of the second conductive nanostructures 500, and the temperature of the thermal process in the forming steps of the sensitive device is between the intrinsic melting point of the conductive layer 200 and that of the second conductive nanostructures 500. As a result, during the thermal process, the conductive layer 200 and the first conductive nanostructures 100 which are covered by the conductive layer 200 are not melted, while the second conductive nanostructures 500 are melted.

In some embodiments, the second conductive nanostructures 500 and the first conductive nanostructures 100 are made of the same material. For example, the first conductive nanostructures 100 and the second conductive nanostructures 500 are silver nanowires. The first conductive nanostructures 100 are silver nanowires wrapped in the conductive layer 200, and the second conductive nanostructures 500 are silver nanowires uncovered by the conductive layer 200. Due to the fact that the intrinsic melting point of the silver nanowires is lower than that of the conductive layer 200, the first conductive nanostructures 100 wrapped by the conductive layer 200 are not melted, while the second conductive nanostructures 500 uncovered by the conductive layer 200 are melted during the thermal process. Therefore, the gas detection ability of the second conductive nanostructures 500 is inferior to that of the first conductive nanostructures 100, so that the second conductive nanostructures 500 can be referred to as disabled gas sensitive structures; on the other hand, the gas detection ability of the first conductive nanostructures 100 is higher than that of the second conductive nanostructures 500, so that the first conductive nanostructures 100 can be referred to as enabled gas sensitive structures. Because the enabled gas sensitive structures and the disabled gas sensitive structures are respectively located inside and outside the conductive layer 200, the conductive layer 200 can isolate the enabled gas sensitive structures from the disabled gas sensitive structures. Therefore, a location of the enabled gas detective structures can be defined using a patterning process of the conductive layer 200.

In some embodiments, the sensitive device can include two electrodes 300. The electrodes 300 are respectively located at two opposite ends of the conductive layer 200, so as to electrically connect to the first conductive nanostructures 100, the conductive layer 200 or both. As a result, the gas sensitive device can obtain the variation of the resistance or the other properties of the first conductive nanostructures 100, the conductive layer 200 or combinations thereof by the two electrodes 300, so as to assist the gas detection. In some embodiments, the material of the electrodes 300 may include aluminum or copper.

Figure 3:
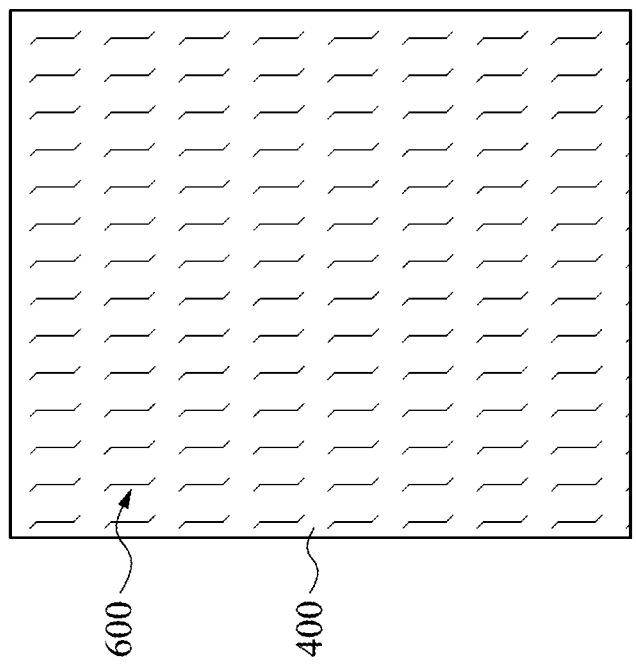

FIGS. 3-6 are a method of forming sensitive device in accordance with some embodiments of the present disclosure. As shown in FIG. 3, a plurality of conductive nanostructures 600 can be formed on the substrate 400. For example, solution containing nanowires can be coated on the substrate 400 to form a plurality of conductive nanostructures 600 on the substrate 400.

Figure 4:
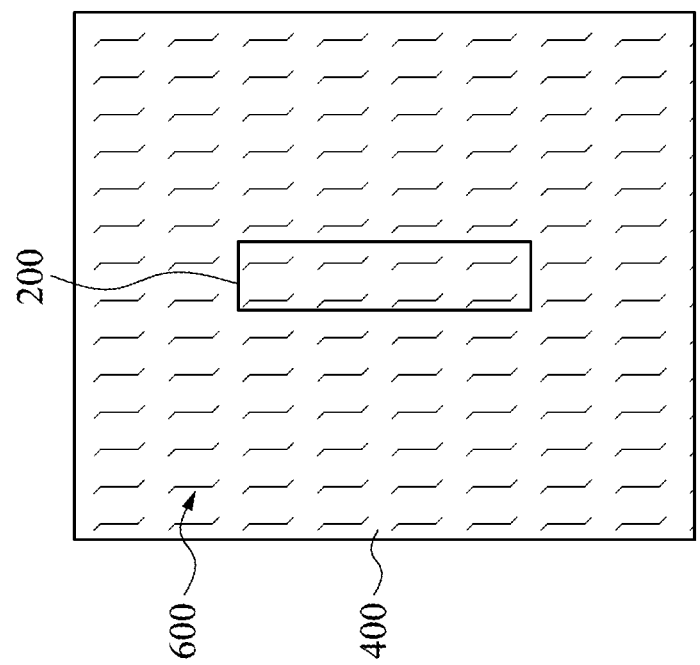
FIG. 3-6 is a forming method of a sensitive device in accordance with some embodiments of the present disclosure.

Thereafter, as shown in FIG. 4, a group of the conductive nanostructures 600 can be covered with the conductive layer 200, and thus another group of the conductive nanostructures 600 are uncovered with the conductive layer 200. For example, in some embodiments, a metallic oxide layer can be blanket formed over the conductive nanostructures 600, and then the blanket metallic oxide layer is patterned to expose the group of the conductive nanostructures 600. In some embodiments, methods of forming the metallic oxide layer include deposition, such as physical vapor deposition (PVD) or chemical vapor deposition (CVD). In some embodiments, the metallic oxide layer can be formed using coating metallic oxide solution on the substrate 400. In some embodiments, the patterning process of the metallic oxide layer can include photolithography and etching operations.

Figure 5:
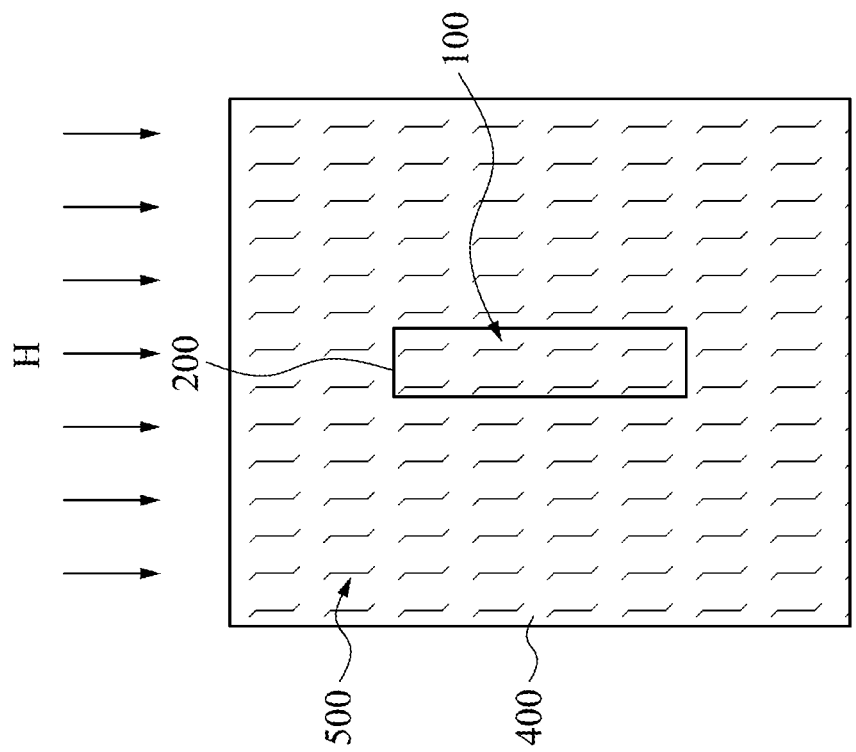

Then, as shown in FIG. 5, the conductive layer 200 and foregoing the conductive nanostructures 600 can be provided with heat H for preforming thermal process. Due to the fact that the intrinsic melting point of the conductive layer 200 is higher than that of the conductive nanostructures 600, the conductive nanostructures 600 uncovered by the conductive layer 200 are melted by the thermal process, and then the second conductive nanostructures 500, as discussed previously, can be formed; on the other hand, the conductive nanostructures 600 covered with the conductive layer 200 are not melted by the thermal process, and then the first conductive nanostructures 100, as discussed previously, can be formed. In some embodiments, the temperature of the thermal process is higher than the intrinsic melting point of the conductive nanostructures 600 but lower than the intrinsic melting point of the conductive layer the conductive layer 200, so that the conductive nanostructures 600 uncovered by the conductive layer 200 can be melted while the conductive layer 200 is not melted.

The first conductive nanostructures 100 which are protected by the conductive layer 200 are not melted, and the second conductive nanostructures 500 which are not protected by the conductive layer 200 are melted. As such, after the thermal process, the gas sensitive ability of the first conductive nanostructures 100 is higher than that of the second conductive nanostructures 500. Therefore, the first conductive nanostructures 100 which are not melted can be referred to as the enabled gas detective structures, and the second conductive nanostructures 500 which are melted can be referred to as disabled gas sensitive structures. Due to the fact that the conductive layer 200 can isolate the enabled gas sensitive structures from the disabled gas sensitive structures, the location of the enabled gas sensitive structures can be defined by the foregoing patterning process of the conductive layer 200. Stated differently, location, shape and size of a region of the substrate 400 occupied by the enabled gas sensitive structures can be defined by that of the conductive layer 200. In some embodiments, the second conductive nanostructures 500 can be removed from the substrate 400 as well. In other words, the disabled gas sensitive structures can be removed, and the enabled gas sensitive structures and the conductive layer 200 can be remained on the substrate 400.

In some embodiments, the thermal process performed in FIG. 5 may be the annealing process. The annealing process can at least relieve accumulated internal stress which is caused by defects (for example, grain boundary, dislocation or point defects), so atoms of the conductive material are capable of rearranging lattice sites to decrease defect density of the conductive material. Decreasing defect density of the first conductive nanostructures 100 and the conductive layer 200 is advantageous to improve the gas sensitive ability. In other words, the annealing process is advantageous to improve the gas sensitive ability of the first conductive nanostructures 100 and the conductive layer 200, and the conductive layer 200 can also prevent the first conductive nanostructures 100 from being damaged by the annealing process. Therefore, the embodiments of the present disclosure can effectively use the conductive nanomaterial to manufacture the sensitive device with the great gas detective ability.

Figure 6:
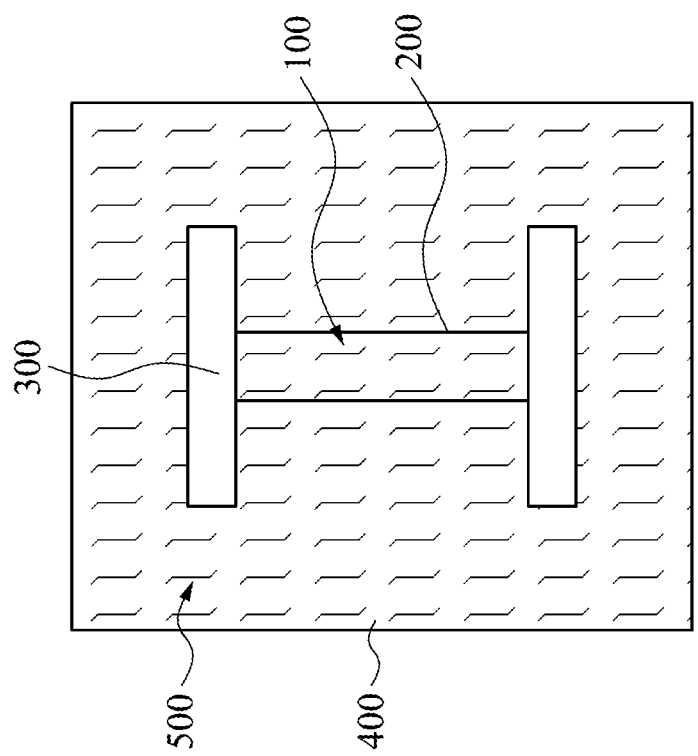

Then, as shown in FIG. 6, the electrodes 300 can be formed to electrically connect to at least one of the conductive layer 200 and the first conductive nanostructures 100 covered by the conductive layer 200. For example, the two electrodes 300 can be formed at the two opposite ends of the conductive layer 200. In some embodiments, the method of forming the electrodes 300 may be physical vapor deposition (PVD) or chemical vapor deposition (CVD). For example, the electrodes 300 can be formed using physical vapor deposition of metallic material at the two opposite ends of the conductive layer 200.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sensitive device, comprising:
   a plurality of first conductive nanostructures, wherein a material of the first conductive nanostructures comprises silver, and the first conductive nanostructures are not melted;
   a plurality of second conductive nanostructures, and the second conductive nanostructures are melted;
   a conductive layer covering the first conductive nanostructures entirely, wherein the second conductive nanostructures are not covered by the conductive layer and are free from coverage, the conductive layer extends along a first direction, an intrinsic melting point of the conductive layer is higher than that of the first conductive nanostructures, and at least one of the conductive layer and the first conductive nanostructures is sensitive to gas, and wherein a material of the conductive layer comprises metallic oxide, and the metallic oxide comprises Indium Tin Oxide (ITO), Indium Zinc Oxide (IZO), Aluminum Zinc Oxide (AZO), aluminum Indium Oxide (AlO), Indium Oxide (INO), Gallium Oxide (GAO), or combinations thereof; and two electrodes electrically connected to at least one of the conductive layer and the first conductive nanostructures, wherein the two electrodes are located at two opposite ends of the conductive layer, and the two electrodes are arranged along the first direction and extend along a second direction perpendicular to the first direction.

2. The sensitive device of claim 1, wherein the first conductive nanostructures are a plurality of silver nanowires.

3. The sensitive device of claim 1, wherein the first and second conductive nanostructures are respectively arranged on different regions of a substrate.

4. The sensitive device of claim 1, wherein the first conductive nanostructures and the second conductive nanostructures are formed of the same material.

5. The sensitive device of claim 1, wherein the first conductive nanostructures are a plurality of silver nanowires wrapped by the conductive layer, and the second conductive nanostructures are a plurality of silver nanowires uncovered by the conductive layer.

6. The sensitive device of claim 1, wherein the intrinsic melting point of the conductive layer is higher than that of the second conductive nanostructures.

* * * * *